United States Patent

Chen

Patent Number: 5,934,040
Date of Patent: *Aug. 10, 1999

[54] PIGMENTED COMPRESSION MOLDED SKINS/DOORS AND METHOD OF MANUFACTURE

[76] Inventor: Kuei Yung Wang Chen, 201, Tung Hwan Rd., Taipei, Taiwan

[*] Notice: This patent issued on a continued prosecution application filed under 37 CFR 1.53(d), and is subject to the twenty year patent term provisions of 35 U.S.C. 154(a)(2).

[21] Appl. No.: 08/740,864

[22] Filed: Nov. 4, 1996

Related U.S. Application Data

[63] Continuation of application No. 08/740,864, Nov. 4, 1996, abandoned.

[51] Int. Cl.$^6$ .................................. E04C 2/22; E04C 2/34
[52] U.S. Cl. ..................................... 52/784.13; 52/309.11; 52/801.11; 52/801.12
[58] Field of Search ........................... 52/784.13, 309.11, 52/784.1, 801.12, 801.11, 801.1, 742.1, 745.19

[56] References Cited

U.S. PATENT DOCUMENTS

| 4,850,168 | 7/1989 | Thorn | 52/784.13 X |
| 5,077,948 | 1/1992 | Olson et al. | 52/784.13 X |
| 5,089,544 | 2/1992 | Ross et al. | 523/511 |
| 5,239,799 | 8/1993 | Bies et al. | 52/784.13 X |

*Primary Examiner*—Christopher Kent
*Attorney, Agent, or Firm*—Joseph L. Strabala

[57] ABSTRACT

In a door constructed of spaced apart compression molded skins reinforced with fiber glass with the core between the skins filled with foam to construct the door, an improved skin for such doors is constructed by adding specific pigments to the raw materials for such skins before compression molding occurs to achieve a surface which is superior in appearance to the skins of such doors which are painted and/or stained after such skins are compression molded and converted into a door. The specific pigments employed are titanium oxide [$TiO_2$], ferric oxide [$Fe_2O_3$], chromium oxide [$Cr_2O_3$], and carbon black and are blended in different percentages to achieve different colors without loss of the integrity of the skin.

4 Claims, 1 Drawing Sheet

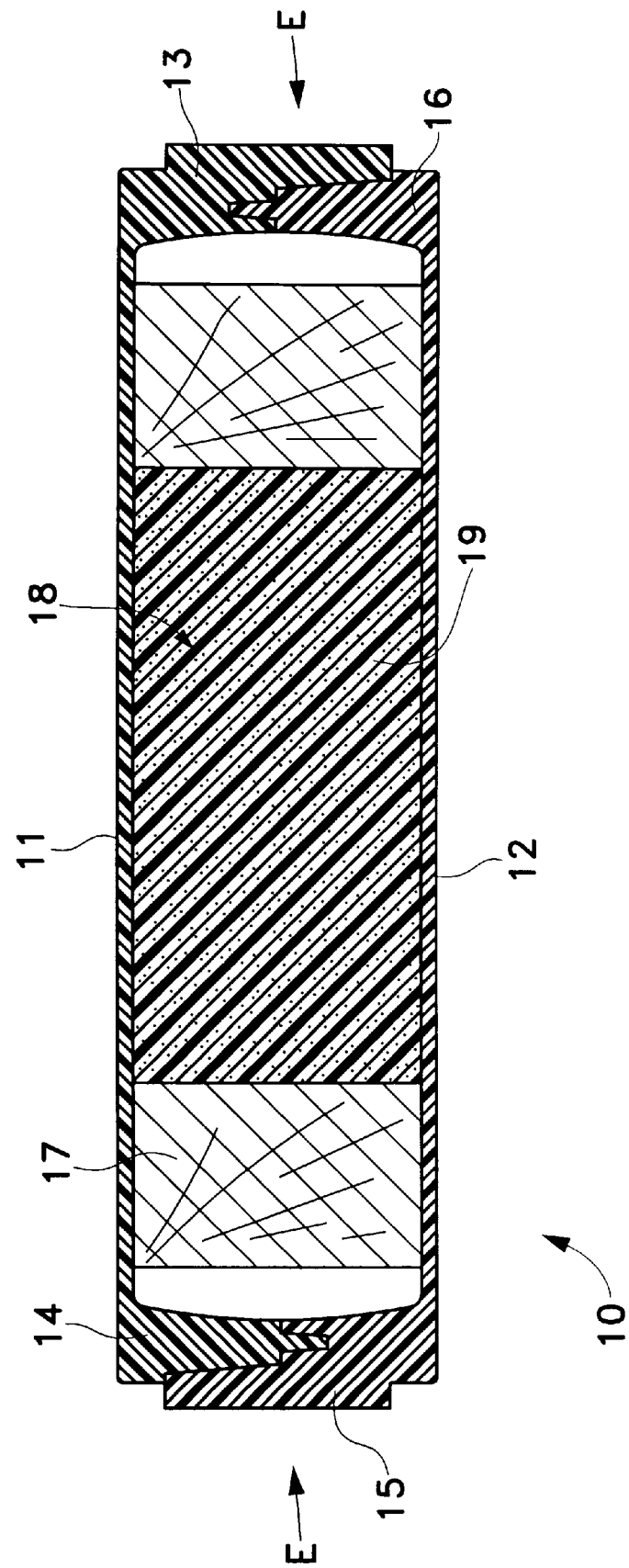

PIGMENTED COMPRESSION MOLDED SKINS/DOORS AND METHOD OF MANUFACTURE

This application is a continuation of application Ser. No. 08/740,864, filed Nov. 4, 1996, now abandoned.

BACKGROUND

Traditionally the molded skins for making doors of the type disclosed in U.S. Pat. No. 3,950,894 issued to DiMaio and U.S. Pat. No. 4,550,540 issued to Thorn are constructed by weight of polyester resin 12% to 15%, polystyrene 5% to 15%, calcium carbonate 40% to 50% and chopped fiber glass 15% to 25%. Such a mixture is placed in layer in a compression molding machine where it is subjected to pressures from 600 to 1,500 psi for a cure period from 60 to 200 seconds. The mixtures are usually referred to 'sheet molding compounds' [SMC] and are normally thermoset materials such as phenolics, urea, melamines and polyesters. A general description of the process is found in an article entitled, "Compression Molding" by N. D. Simons in *Modern Plastics Encyclopedia*, Vol. 54 No. 10A (1977–78).

The result of the SMC process is a skin having a thickness of from about 0.05 inches to about 0.20 inches, depending on the application, which can be use in the doors of the type referenced. However, the prior art skins when removed from the mold have pale gray, streaked appearance. Thus, doors, and other products constructed with such prior art skins must be painted or stained to achieve a product which is architecturally acceptable.

Staining or painting such door products is expensive and time consuming; further the surfaces of such skins is not very porous, often requiring expensive materials or processes to paint them. Further such painted or stained door products may become scratched or abraded in use whereby they may look tacky and cheap after installation.

Another draw back of such prior art door products is that staining or painting may obscure patterns impressed on the exterior of the surface of the skins during the molding process.

In addition, when using skins which are stained or painted, the edges when trimming is required exposes areas of discoloration.

With the instant invention the color is distributed uniformity throughout the skin, whereby scratches and abrasions will not to be so apparent during service and trimming the skins will not result in a variegated or streaked door structure with color discontinuities in the area where the trimming occurs.

Further actual tests of the doors using skins made according to the instant invention have shown improved weathering characteristics under ASTM G26 testing procedures over the conventional stained or painted doors of a similar construction.

It has been found that certain pigments may be added to the conventional raw materials used to manufacture skins of the type described without degrading the resulting skin product formed through or by the compression molding processes whereby a multitude of colors can be achieved. In this regard, titanium oxide, ferric oxide, chromium oxide and carbon black in mixtures, or as individual components, can be added in quantities up to 20% without degrading the skins.

SUMMARY OF THE INVENTION

A novel compression molded skin product is composed by weight of polyester resins 12% to 15%, polystyrene 5% to 15%, calcium carbonate 40% to 50% and chopped fiber glass 15% to 25%, along with a pigment from 3% to 20% by weight selected from the group consisting of titanium oxide, ferric oxide (iron oxide), chromium oxide and carbon black.

Further the product is made by mixing a pigment from 3% to 15% by weight selected from the group consisting of titanium oxide, ferric oxide, chromium oxide and carbon black with a mixture by weight of polyester resins 12% to 15%, polystyrene 5% to 15%, calcium carbonate 40% to 50% and chopped fiber glass 15% to 25% whereafter the resulting mixture is subjected to pressures of from 600 to 1,500 psi, or higher, for a period of 60 to 200 seconds between two compression molding dies with the addition of heat up to 400 degrees F. and sometimes higher.

A pigmented trimmable door product can be manufactured if the skins made as described, include integral edges which mate with one another to leave a hollow core which is filled with foam.

DESCRIPTION OF THE DRAWINGS

The invention will be better understood by referring to the attached drawing, in conjunction with this specification wherein:

FIG. 1 is a cross section of a commercial door product using the skins made according to this invention.

DESCRIPTION OF A PREFERRED EMBODIMENT

Polyester resins are known in the art and are readily prepared by fusing a mixture of phthalic or isophthalic anhydride, maleic anhydride and propylene glycol. Such resins can be cured (converted to infusible structures) by catalysts and/or heat.

A more or less conventional mixture for manufacturing traditional skin use in door products made by sheet compression molding, is as follows:

| | |
|---|---|
| Polyester resins | 12% to 20% |
| Polystyrene | 5% to 15% |
| Calcium carbonate | 40% to 50% |
| Chopped fiber glass | 15% to 25% |

Composition #1: For a White Pigmented Skin

To construct a white pigmented, reinforced skin using a compression molding process of the type described the following mixture, by weight, was prepared:

| | |
|---|---|
| Polyester resins | 12% to 20% |
| Polyethylene | 2% to 5% |
| Polystyrene | 3% to 10% |
| Titanium Oxide | 10% to 20% |
| Calcium carbonate | 20% to 35% |
| Chopped fiber glass | 15% to 25% |

Composition #2: A Brown Pigmented Skin

To constructed a brown pigmented, reinforced skin using a compression molding process of the type described the following mixture was prepared:

| | |
|---|---|
| Polyester resins | 12% to 20% |
| Polyethylene | 2% to 5% |
| Polystyrene | 3% to 10% |
| Ferric oxide | 1% to 3% |

| | |
|---|---|
| Chromium Oxide | .5% to 2.5% |
| Carbon Black | .1% to 0.5% |
| Calcium Carbonate | 20% to 35% |
| Chopped fiber glass | 15% to 25% |

Once one or the other composition has been prepared the resulting mixture is subjected to pressures of from 600 to 1,500 psi for a period of 60 to 200 seconds between two compression molding dies with the addition of heat up to 400 degrees F.

The resultant fused skin will have a uniform color throughout its thickness, in Composition #1 "white" and in Composition #2 "brown". Thus when such skins are used in door structures such as described in the above patents, the skins may be trimmed without a loss of color uniformity which is a distinct advantage.

The skin products made according to this invention have particular application to door products or the like wherein integral parts of the skin are used to close the edges of a door, for example see U.S. Pat. No. 4,864,789 issued to Thron. Thus, if skins include an integral edge about the perimeter having a thickness much greater than the thickness of the skin which mates with such an edge formed the other skin, a thick edge is provided which can be trimmed without distortion of color of the door. While the construction shown in the referenced patent is not suitable for trimming, the use of differently constructed mating edges do allow for the novel trimming described.

Using both compositions #1 and #2 doors have been constructed according to the door cross section illustrated in FIG. 1. It can be seen that this door product 10 has exterior skins 11 and 12. Each of these skins have integral edge members; on skin 11, integral edges 13 and 14, and on skin 12, integral edges 15 and 16 which edges are formed when the compression molding process is carried out and extend normal to the surfaces of their associated skin. The thickness of the integral edges is much thicker than the thickness of the skins and usually ranges from 0.2 inches to 1.00 inches to allow for trimming.

When the door 10 is constructed the integral edges 13, 14, 15 and 16 mate with one another to close the edges of the door as can be seen in FIG. 1. If desired stiles 17 can be placed between the skins 11 and 12 before the edges are glued together. Rails (not shown) may also be used. When either stiles or rails are used they are glued to the skins but do not engage the integral edges.

The core 18 between the two skins 11 and 12 is filled with a foam 19. A foam which is very suitable for this purpose is a high density polyurethane form which is often used in a door of this type. By making a small bore through one of the edges, a probe can be inserted to introduce foam agents in to the core 18 of the door, which will then expand to fill it.

Commercially available polyurethane foam is capable of foaming at relatively low temperatures, and expands to an apparent density of approximately 2 pounds per cubic foot. Other foam may used however, even though polyurethane foam is used in the preferred embodiment of the door product of the invention.

Using the skins made with composition #1 or #2 according to the disclosure in FIG. 1, it can be appreciated that the edges "E" of the door can be trimmed to make the door fit the jam. When such trimming takes place, due to the uniformity of color throughout the skins and their edges, no discoloration occurs and the trimmed edges of the door can be lightly sanded to bring them in conformity with the planner surfaces of the skins 11 and 12 of the door 10.

As indicated doors made with these skins do not have to be stained or painted; a study of the costs to paint or stain the prior art doors indicate that labor and materials to stain a prior art door can run from $40.00 to $100.00 which is saved by using a pigmented door; further the pigmented door can be stained or painted when desired and where only a shade of brown or white is desired, a cost saving is still obtained.

The polyethylene in the compositions provide increased strength in the skins and improved weather resistance. For example the tests made according the ASTM G26 procedures disclosed the follows results comparing the new pigmented door to a prior art stained door of similar construction.

| STAINED DOOR | | PIGMENTED DOOR | |
|---|---|---|---|
| polyester resin | 12%~20% | polyester resin | 12%~20% |
| polystyrene | 5%~15% | polyethylene | 2~5% |
| | | polystyrene | 3~10% |
| Calcium carbonate | 40%~50% | titanium oxide | 10~20% |
| | | Calcium carbonate | 20~35% |
| chopped fiber glass | 15~25% | chopped fiber glass | 15~25% |
| OTHER | | OTHER | |

When doors of the type described are manufactured, a graining pattern is usually placed in the dies which gives the outer surfaces of the fused skins a natural look, by creating imitation wood grain patterns thereon. When doors are stained and/or painted such patterns, having depths in the range of 0.0045 inches to 0.0006 inches, are often filled with the paint or stain, drastically changing the surface appearance if the skins. With this invention, since the pigment is in the skin and uniform through out the skin, any imitation graining pattern of the skins is vibrant and positive, improving the over all quality of the door.

In the past gel coats have been used in SMC molding processes, as suggested by U.S. Pat. No. 3,950,894, which can include pigments, fillers, etc. However, such coats are expensive processes and, by necessity, very thin. As a result these coats are subject to chipping during the normal use of doors of the type described which are made with such SMC skins. Further when such gel coats are used the door cannot be trimmed without trimming off the gel coat.

Patterns of the type referenced above can be made by the process described in U.S. Pat. No. 3,498,001 which teaches how to form graining patterns in metal dies for compression molding processes.

The inorganic pigments referenced herein have been used with polyester resins as colorants in the past, but generally not in SMC processes nor in the formulations set forth in this application which during actual fabrication using SMC processes have delivered a product of exceptional quality.

As to organic colorants, some such colorants can withstand the temperatures and pressures involved in the SMC processes, and it is expected that such stable organic colorants might be used in a pigmented, trimmable door product of the type described.

Having described my invention, I claim:

1. A synthetic door product comprising spaced apart compression molded skins with integral edges, said integral edges operable to mate to close the entire perimeter of said door between said skins forming a core space there between, said core space filled with a high density foam and said skins comprising by weight from 12% to 20% polyester resin, 5 to 15% polyethylene, 3% to 10% polystyrene, 20% to 35% calcium carbonate and 15% to 25% chopped fiberglass and having from 1% to 15% of a pigment selected from the group consisting of titanium oxide, iron oxide, chromium oxide and carbon black whereby said skins will have a uniform coloration throughout.

2. The synthetic door product defined in claim 1 wherein the pigment is by weight 10% to 20% titanium oxide.

3. The synthetic door product defined in claim 1 wherein the pigment is by weight 1% to 3% iron oxide, 0.01% to 2.5% chromium oxide and from 0.01% to 0.5% carbon black.

4. A synthetic door product comprising spaced apart compression molded skins joined with integral edges, said integral edges operable to mate to close the entire perimeter of said door between said skins forming a core space between said skins, said core space filled with a high density foam and said skins comprising by weight from 12% to 20% polyester resin, 5 to 15% polyethylene, 3% to 10% polystyrene, 20% to 35% calcium carbonate and 15% to 25% chopped fiberglass and having from 10% to 25% by weight of titanium oxide whereby said skins will have a uniform white coloration throughout enabling said perimeter to be trimmed without coloration variations.

* * * * *